United States Patent
Shim et al.

(10) Patent No.: US 10,283,004 B2
(45) Date of Patent: May 7, 2019

(54) MULTIMEDIA APPARATUS, ONLINE EDUCATION SYSTEM, AND METHOD FOR PROVIDING EDUCATION CONTENT THEREOF

(71) Applicant: SAMSUNG ELECTRONICS CO., LTD., Suwon-si (KR)

(72) Inventors: Hyun-sik Shim, Seongnam-si (KR); Hyo-in Ahn, Seoul (KR); Young-chul Sohn, Seoul (KR); Ho-chul Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 14/530,114

(22) Filed: Oct. 31, 2014

(65) Prior Publication Data
US 2015/0125842 A1 May 7, 2015

(30) Foreign Application Priority Data

Nov. 1, 2013 (KR) .................. 10-2013-0132131

(51) Int. Cl.
*G09B 5/06* (2006.01)
*G06F 21/31* (2013.01)
(Continued)

(52) U.S. Cl.
CPC .............. *G09B 5/06* (2013.01); *G06F 21/31* (2013.01); *G06F 21/316* (2013.01);
(Continued)

(58) Field of Classification Search
CPC . G09B 19/00; G09B 5/00; G09B 5/06; G09B 7/00; G09B 5/062; G06F 21/31; G06F 21/6245; G06F 21/316
(Continued)

(56) References Cited

U.S. PATENT DOCUMENTS 8,484,224 B1 * 7/2013 Harris ............... G06F 17/30041
707/723
9,268,820 B2 * 2/2016 Henry ................. G06F 17/3053
(Continued)

FOREIGN PATENT DOCUMENTS

KR 10-2012-0065111 A 6/2012
WO 2013085193 A1 6/2013

OTHER PUBLICATIONS

Search Report dated Feb. 5, 2015, issued by the International Searching Authority in counterpart International Application No. PTO/KR2014/010173.
(Continued)

*Primary Examiner* — Jack Yip
(74) *Attorney, Agent, or Firm* — Sughrue Mion, PLLC

(57) ABSTRACT

A multimedia apparatus and a method for providing content thereof are provided. In the method for providing content of the multimedia apparatus, user private information corresponding to authentication information of a user is acquired when the authentication information of the user for execution of content is received, a state of the user using at least one sensor is detected during reproduction of the content, a parameter of the content is changed according to the acquired private information and the state of the user, and the content is reproduced with the changed parameter.

14 Claims, 10 Drawing Sheets

(51) Int. Cl.
   *G06F 21/62* (2013.01)
   *G09B 7/00* (2006.01)
   *G09B 19/00* (2006.01)
   *G09B 5/00* (2006.01)

(52) U.S. Cl.
   CPC ......... *G06F 21/6245* (2013.01); *G09B 5/062* (2013.01); *G09B 7/00* (2013.01); *G09B 5/00* (2013.01); *G09B 19/00* (2013.01)

(58) Field of Classification Search
   USPC ......................................................... 434/322
   See application file for complete search history.

(56) References Cited

U.S. PATENT DOCUMENTS

| | | | |
|---|---|---|---|
| 2003/0124493 A1 | 7/2003 | Kulack | |
| 2004/0137414 A1 | 7/2004 | Ho et al. | |
| 2006/0040248 A1 | 2/2006 | Aaron | |
| 2007/0061720 A1* | 3/2007 | Kriger | G06F 17/214 715/700 |
| 2007/0100829 A1* | 5/2007 | Allen | G06F 17/3089 |
| 2007/0231782 A1* | 10/2007 | Ozawa | G09B 5/00 434/350 |
| 2008/0022211 A1* | 1/2008 | Jones | G09B 7/00 715/739 |
| 2009/0035733 A1* | 2/2009 | Meitar | G09B 7/00 434/118 |
| 2009/0066722 A1* | 3/2009 | Kriger | G06Q 30/02 345/619 |
| 2010/0004969 A1 | 1/2010 | Menear et al. | |
| 2012/0231438 A1* | 9/2012 | Fakhrai | G09B 7/00 434/350 |
| 2012/0244503 A1* | 9/2012 | Neveldine | G09B 19/00 434/236 |
| 2012/0251989 A1* | 10/2012 | Wetmore | G09B 19/00 434/236 |
| 2012/0282585 A1* | 11/2012 | Baer | G09B 5/067 434/307 R |
| 2013/0085955 A1* | 4/2013 | Dugas | G09B 5/00 705/326 |
| 2013/0190556 A1* | 7/2013 | Wetmore | A61M 21/02 600/28 |
| 2014/0006326 A1* | 1/2014 | Bazanov | G06Q 10/103 706/46 |
| 2014/0024009 A1* | 1/2014 | Nealon | G09B 5/12 434/362 |
| 2014/0057232 A1* | 2/2014 | Wetmore | G09B 19/00 434/236 |
| 2014/0143655 A1* | 5/2014 | Alon | G06Q 30/0202 715/234 |
| 2014/0234826 A1* | 8/2014 | Breznitz | G09B 7/00 434/362 |
| 2014/0272908 A1* | 9/2014 | Black | G09B 5/08 434/362 |
| 2014/0341473 A1 | 11/2014 | Lee et al. | |
| 2014/0370470 A1* | 12/2014 | Aristizabal | G06F 19/3418 434/236 |
| 2015/0056598 A1* | 2/2015 | Kutty | G09B 7/08 434/362 |
| 2015/0104771 A1* | 4/2015 | Bernstein | A61B 5/0484 434/236 |

OTHER PUBLICATIONS

Written Opinion dated Feb. 5, 2015, issued by the International Searching Authority in counterpart International Application No. PTO/KR2014/010173.

* cited by examiner

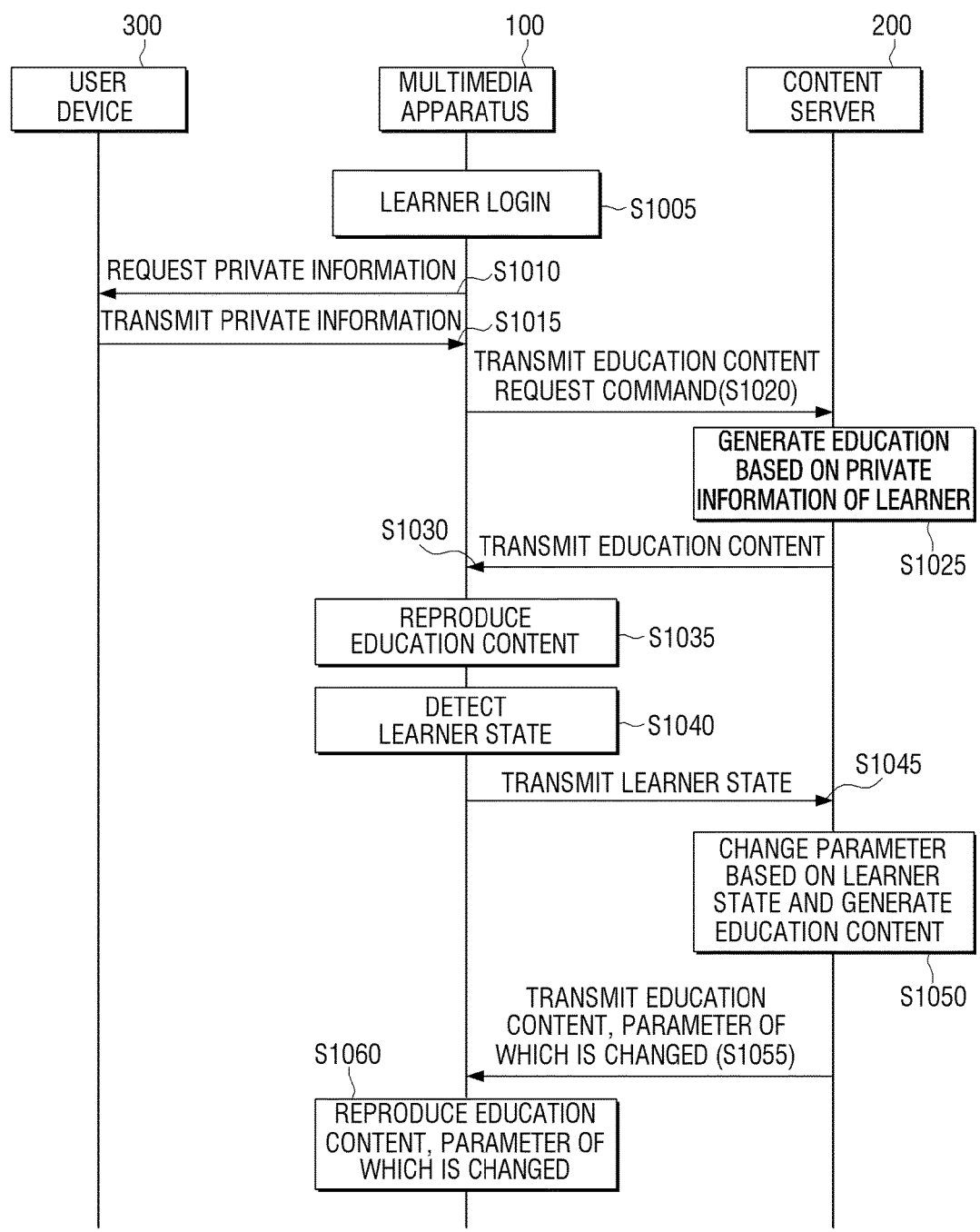

MULTIMEDIA APPARATUS, ONLINE EDUCATION SYSTEM, AND METHOD FOR PROVIDING EDUCATION CONTENT THEREOF

CROSS-REFERENCE TO RELATED APPLICATIONS

This application claims priority from Korean Patent Application No. 10-2013-0132131, filed on Nov. 1, 2013, in the Korean Intellectual Property Office, the disclosure of which is incorporated herein by reference in its entirety.

BACKGROUND

Field

One or more exemplary embodiments relate to a multimedia apparatus, an online education system, and a method for providing content thereof, and more particularly, to a multimedia apparatus for reproducing education content according to user private information and user state, an online education system, and a method for providing content thereof.

Description of the Related Art

In recent days, as communication technologies have developed, service markets for education content using online communication have widened. A conventional education content service refers to a method for streaming education content set by a user in real time by an external content server according to a type of the education content.

That is, the conventional education content service unilaterally provides education content to a user without consideration of user information and user state. Due to this, learning efficiency of the user is degraded.

Accordingly, there is a need for a method for providing education content in consideration of user information and user state.

SUMMARY

Exemplary embodiments may overcome the above disadvantages and other disadvantages not described above. Exemplary embodiments are not required to overcome all the disadvantages described above, and exemplary embodiments may not overcome any of the problems described above.

One or more exemplary embodiments provide a multimedia apparatus for providing education content in consideration of user private information and user state, an online education system, and a method for providing content thereof.

According to an aspect of one or more exemplary embodiments, a method for providing content of a multimedia apparatus includes acquiring user private information corresponding to authentication information of a user, upon receiving the authentication information of the user for execution of content, detecting state of the user using at least one sensor during reproduction of the content, changing a parameter of the content according to the acquired private information and the state of the user, and reproducing the content with the changed parameter.

The private information of the user may include at least one from the set of preference information and schedule information of the user.

The acquiring may include acquiring at least one from the set of a usage log and a search record from at least one device used by the user to acquire the preference information of the user upon receiving the authentication information of the user. The usage log and the search record may be acquired in real time.

The acquiring may include acquiring the schedule information from at least one device used by the user upon receiving the authentication information of the user The reproducing may include, in response to the content being education content, generating and reproducing a question or feedback using at least one from the set of the preference information and schedule information of the user.

The detecting may include detecting concentration of the user according to a blink rate of the user and an eyesight direction of the user, photographed by a camera, and motion of a user face detected by a motion sensor.

The detecting may include outputting a question about content that is currently reproduced at a predetermined interval, and detecting an understanding of the user according to a user response to the question. The response may be a voice user voice response input through a microphone.

The reproducing may include transmitting the detected state of the user to a content server, receiving content that is changed according to a parameter of content corresponding to the detected state of the user, from the content server, and reproducing the received content.

The content server may store the parameter of the content in the form of an object template, and the object template may be mapped to the state of the user.

In response to the content being education content, a parameter of the education content may include at least one from the set of a teaching method, content type, learning difficulty, learning speed, learning feedback, learning time, learning language, intonation, and learning amount of the education content when the content is education content.

According to another aspect of one or more exemplary embodiments, a multimedia apparatus includes a detector configured to detect a user state using at least one sensor, a reproducer configured to reproduce content, and a controller configured to control the reproducer to acquire user private information corresponding to authentication information of a user, upon receiving the authentication information of the user for execution of content, to control the detector to detect the user state using at least one sensor during reproduction of the content, and to change a parameter of the content according to the acquired private information and the state of the user and to reproduce the content.

The private information of the user may include at least one from the set of preference information and schedule information of the user.

The controller may acquire at least one from the set of a usage log and a search record from at least one device used by the user to acquire the preference information of the user upon receiving the authentication information of the user. The acquiring may be in real time.

The controller may acquire the schedule information from at least one device used by the user upon receiving the authentication information of the user.

In response to the content being education content, the controller may control the reproducer to generate and reproduce a question or feedback using at least one from the set of the preference information and schedule information of the user.

The detector may further includes a camera and a motion sensor, and the controller may detect concentration of the user according to a blink rate of the user and an eyesight direction of the user, photographed by a camera, and motion of a user face detected by a motion sensor.

The controller may output a question about reproduced content at a predetermined interval and detect an understanding of the user according to a user response to the question. The response may be a voice response input through a microphone.

The multimedia apparatus may further include a communicator configured to communicate with an external content server, wherein the controller may control the communicator to transmit the detected state of the user to the content server and to receive content that is changed according to a parameter of content corresponding to the detected state of the user, from the content server, and controls the reproducer to reproduce the received content.

The content server may store the parameter of the content in the form of object template, and the object template may be mapped to the state of the user.

In response to the content being education content, a parameter of the education content may include at least one from the set of a teaching method, content type, learning difficulty, learning speed, learning feedback, learning time, learning language, intonation, and learning amount of the education content when the content is education content.

According to another aspect of one or more exemplary embodiments, a method for providing content of an online education system includes acquiring private information of a user that logs in when the user logs in education content, by a multimedia apparatus, transmitting an education content request command included in the private information of the user to a content server, by the multimedia apparatus, transmitting education content based on the private information of the user, by the content server, reproducing the transmitted education content, by the multimedia apparatus, detecting a user state using a detector during reproduction of the executed education content, by the multimedia apparatus, transmitting the detected state of the user to the content server, by the multimedia apparatus, changing the education content according to a parameter corresponding to the detected state of the user, transmitting the changed education content to the multimedia apparatus, by the content server, and reproducing the changed education content, by the multimedia apparatus.

According to another aspect of one or more exemplary embodiments, an online education content server configured to provide education content includes a communicator configured to communicate with a multimedia apparatus, and a controller configured to control the communicator to receive private information of a user that logs into a multimedia apparatus, to control the communicator to transmit the education content to the multimedia apparatus based on the private information of the user, to control the communicator to receive a user state of the user detected by the multimedia apparatus, to change the education content according to a parameter corresponding to the user state, and to control the communicator to transmit the changed education content to the multimedia apparatus.

According to the aforementioned various exemplary embodiments, education content that is actively changed according to user private information and learning state is provided such that a user effectively performs learning using education content.

Additional and/or other aspects and advantages of one or more exemplary embodiments will be set forth in part in the description which follows and, in part, will be obvious from the description, or may be learned by practice of the invention.

BRIEF DESCRIPTION OF THE DRAWING FIGURES

The above and/or other aspects of one or more exemplary embodiments will be more apparent by describing certain exemplary embodiments with reference to the accompanying drawings, in which:

FIG. 10 is a sequence diagram illustrating a method for providing education content of an online education system according to an exemplary embodiment.

DETAILED DESCRIPTION OF THE EXEMPLARY EMBODIMENTS

Figure 1:
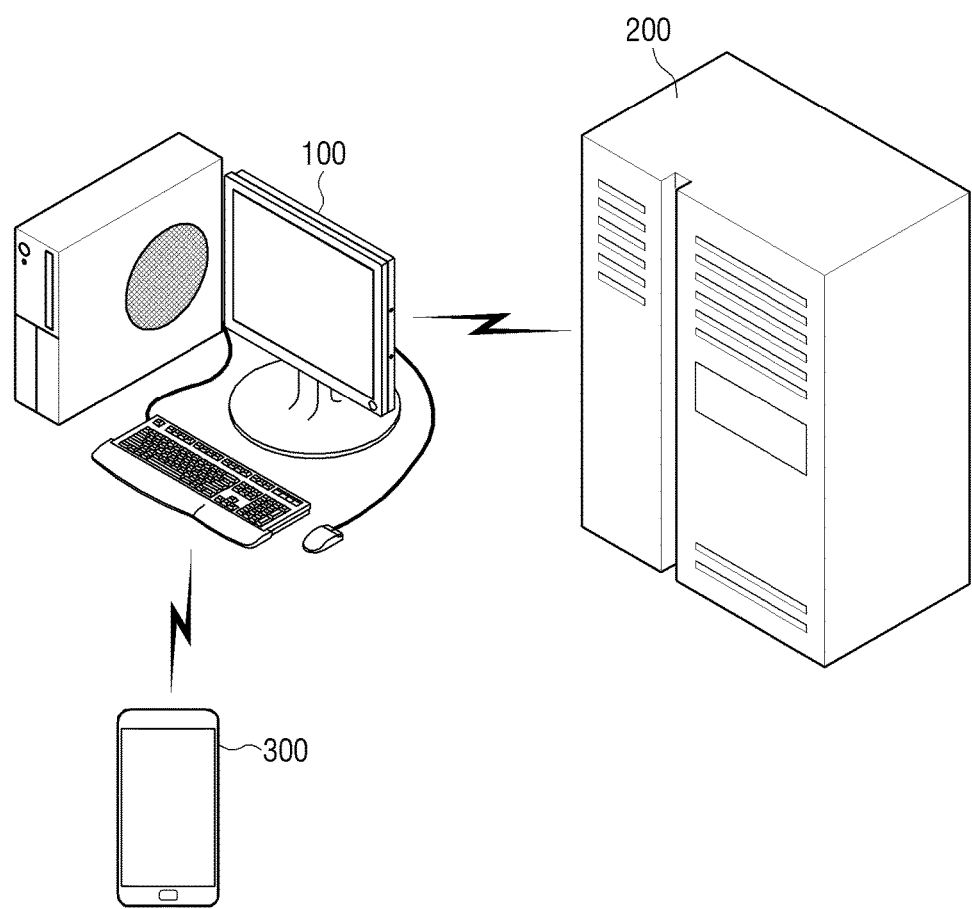
FIG. 1 is a diagram illustrating an online education system according to an exemplary embodiment.

Certain exemplary embodiments will now be described in greater detail with reference to the accompanying drawings. FIG. 1 is a diagram illustrating an online education system 10 according to an exemplary embodiment. As illustrated in FIG. 1, the online education system 10 includes a multimedia apparatus 100, a content server 200, and a user device 300. As illustrated in FIG. 1, as a non-limiting example, the multimedia apparatus 100 may be embodied as a desk top personal computer (PC). However, the multimedia apparatus 100 may be embodied as various multimedia devices such as a smart television (TV), a tablet PC, a smart phone, a notebook PC, and the like.

The multimedia apparatus 100 receives authentication information of a user in order to perform a user login procedure for execution of education content. As a non-limiting example, the multimedia apparatus 100 may receive the user login procedure using ID/password. However, the user login procedure may be performed using various recognition methods such as fingerprint recognition, face recognition, iris scan, voice recognition, and the like.

Upon receiving the authentication information of the user, the multimedia apparatus 100 acquires private information of the user from a device used by the user. In this case, the device used by the user may be the multimedia apparatus 100 or an external device such as the user device 300.

In particular, the multimedia apparatus 100 may acquire one of user preference information and schedule information from the device 100 or 300 used by the user. In particular, the multimedia apparatus 100 may acquire the user preference information based on a usage log or a search record of the device 100 or 300 used by the user. In addition, the multimedia apparatus 100 may acquire schedule information from the device 100 or 300.

In addition, the multimedia apparatus 100 transmits an education content request command to the external content server 200. In this case, the education content request command may include user private information (e.g., preference information, schedule information, PIMS information, etc.).

The content server 200 generates education content in response to the education content request command and transmits the generated education content to the multimedia apparatus 100. In detail, the content server 200 may generate education content based on private information included in the education content request command and transmit the generated education content in a streaming form to the multimedia apparatus 100.

The multimedia apparatus 100 may reproduce the education content received from the content server 200.

During reproduction of the education content, the multimedia apparatus 100 may detect a user state using various sensors. The user state may be an understanding or concentration of the user. In particular, the multimedia apparatus 100 may detect concentration of the user according to a blink rate of the user and an eyesight direction of the user, which may be photographed by a camera, and motion of a user face detected by a motion sensor. In addition, the multimedia apparatus 100 may output questions about the education content that is currently reproduced at predetermined intervals and determine understanding of the user according to user voice input through a microphone in response to the questions.

The multimedia apparatus 100 may transmit information about the user state to the content server 200.

The content server 200 may change a parameter of the education content based on the transmitted user state. The parameter of the education content may include, as a non-limiting example, at least one of a teaching method, content type, learning difficulty, learning speed, learning feedback, learning time, learning language, intonation, and learning amount of the education content, and may be stored in the form of a learning object template mapped to the user state in the content server 200.

The content server 200 transmits the education content, the parameter of which is changed, to the multimedia apparatus 100. The multimedia apparatus 100 reproduces the education content, the parameter of which is changed.

Thus, the user may receive the education content generated according to private information and state of the user, thereby further improving learning efficiency.

Hereinafter, the multimedia apparatus 100 will be described in more detail with reference to FIGS. 2 to 7.

Figure 2:
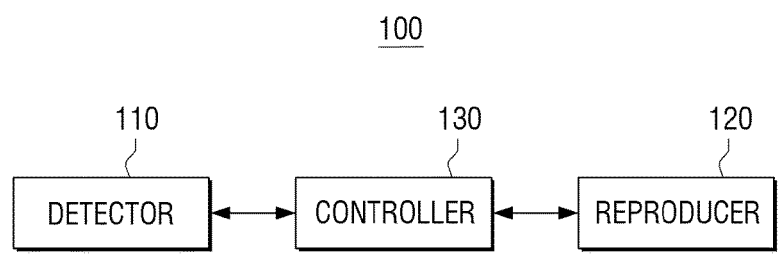
FIG. 2 is a schematic block diagram illustrating a structure of a multimedia apparatus according to an exemplary embodiment.

FIG. 2 is a schematic block diagram illustrating a structure of the multimedia apparatus 100 according to an exemplary embodiment. As illustrated in FIG. 2, the multimedia apparatus 100 includes a detector 110, a reproducer 120, and a controller 130.

The detector 110 detects user state using various sensors. As a non-limiting example, the detector 110 may detect a blink rate of the user and an eyesight direction of the user using a camera. The detector 110 may also detect motion of a user face using a motion sensor.

The reproducer 120 reproduces education content according to control of the controller 130. The reproducer 120 may include a display for displaying image data of education content and an audio output unit for outputting audio data of the education content. The term "unit" as used herein means a hardware component, such as a processor or circuit, and/or a software component that is executed by a hardware component such as a processor.

The controller 130 controls an overall operation of the multimedia apparatus 100. Upon receiving user authentication information for execution of content, the controller 130 acquires user private information corresponding to authentication information and detects the user state using the detector 110 during reproduction of the executed education content. In addition, the controller 130 may control the reproducer 120 to change a parameter of content and to reproduce the content according to the user private information and the user state. In this case, the content may be education content. However, this is purely exemplary. That is, the content may be one of various contents such as news content, sports content, and the like.

In detail, the controller 130 may receive user authentication information by performing a user login procedure via various authentication methods. As non-limiting examples, the controller 130 may perform the user login procedure using various authentication methods such as an ID/password method, fingerprint recognition, face recognition, iris scan, voice recognition, and the like.

Upon receiving the user authentication information, the controller 130 acquires the user private information corresponding to the authentication information. As non-limiting examples, the user authentication information may include at least one of user PIMS information, user preference information, and user schedule information. In particular, the controller 130 may acquire a usage log or a search record from at least one device used by the user in real time to acquire user preference information. In addition, the controller 130 may acquire schedule information from at least one device used by the user.

In addition, the controller 130 may control the reproducer 120 to reproduce content based on the user private information. Upon acquiring the user preference information and schedule information, the controller 130 may transmit the acquired user preference information and schedule information to the content server 200. Upon generating and receiving questions or feedbacks based on at least one of the user preference information and schedule information from the content server 200, the controller 130 may control the reproducer 120 to reproduce the received questions or feedback.

During reproduction of content, the controller 130 may detect the user state using the detector 110. The controller 130 may detect concentration of the user according to a blink rate of the user and an eyesight direction of the user, which are photographed by a camera, and motion of a user face detected by a motion sensor. In addition, the controller 130 may control the reproducer 120 to output questions about information of education content that is currently reproduced at a predetermined interval and detect understanding of the user according to user voice input through a microphone in response to the questions.

In addition, the controller 130 may control the reproducer 120 to change a parameter of content based on the detected user state and to reproduce the content. The controller 130 may control the reproducer 120 to transmit the detected user state to the content server 200, to receive the content, the parameter of which is changed to a parameter of content corresponding to the detected user state, from the content server 200, and to reproduce the received content. When the content is education content, the changeable parameter of the education content may include at least one of a teaching method, content type, learning difficulty, learning speed, learning feedback, learning time, learning language, intonation, and learning amount of the education content.

Figure 3:
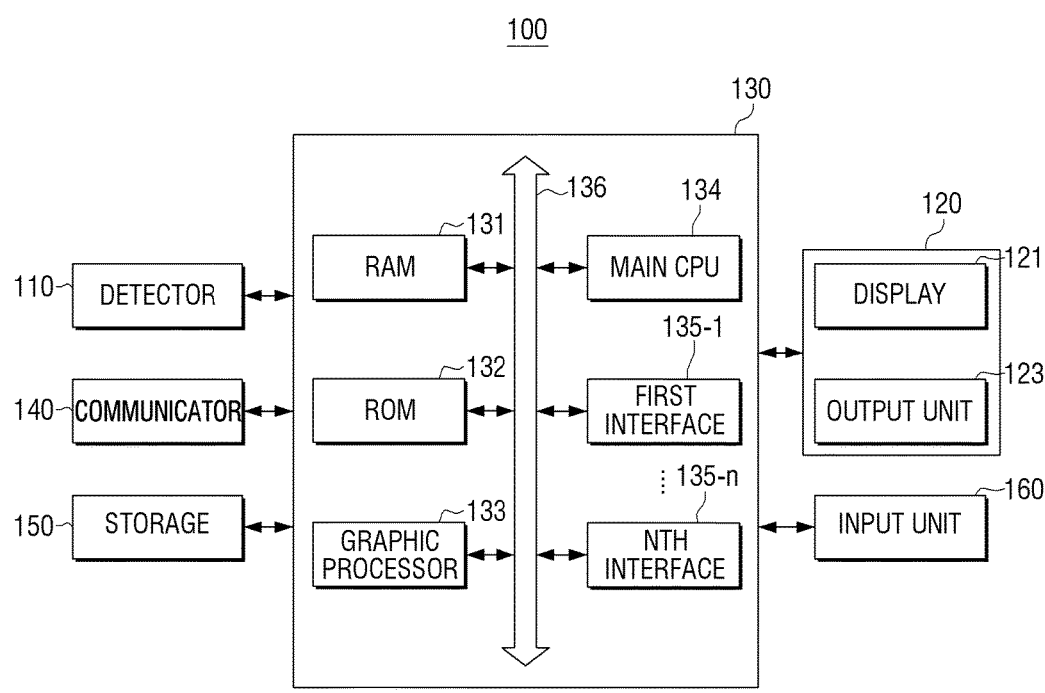
FIG. 3 is a block diagram illustrating a structure of the multimedia apparatus in detail according to an exemplary embodiment.

FIG. 3 is a block diagram illustrating a structure of the multimedia apparatus 100 in detail according to an exemplary embodiment. As illustrated in FIG. 3, the multimedia apparatus 100 includes the detector 110, a communicator 140, a storage 150, the reproducer 120, an input unit 160, and the controller 130.

FIG. 3 illustrates various components in a case in which the multimedia apparatus 100 has various functions such as a communication function, a content reproducing function, a display function, and the like. Thus, in one or more exemplary embodiments, some of the components illustrated in FIG. 3 may be omitted or changed, or other components may be further added.

The detector 110 detects user state using various sensors. In this case, the detector 110 may include, as non-limiting examples, a camera (not illustrated), a motion sensor (not illustrated), a microphone (not illustrated), and the like. In detail, the detector 110 may detect a blink rate of the user, an eyesight direction, motion of a user face, and the like of the user using a camera, and detect the motion of the user face using a motion sensor. In addition, the detector 110 may detect a user voice answer in response to questions of the education content using a microphone.

As described above, the detector 110 may detect the user state using, as non-limiting examples, a camera, a motion sensor, a microphone, or the like. Thus, the detector 110 may detect the user state using other sensors. For example, the detector 110 may detect the user state using various sensors such as a brainwave recognition sensor, a pulsation recognition sensor, a blood recognition sensor, and the like.

The communicator 140 is a component that may communicate with various types of external devices using various types of communication methods. The communicator 140 may include various communication chips, such as, as non-limiting examples, a WiFi chip, a Bluetooth chip, a near field communication (NFC) chip, a wireless communication chip, etc. In this case, the WiFi chip, the Bluetooth chip, and the NFC chip may perform communication via a WiFi method, a Bluetooth method, and an NFC method, respectively. Among these, the NFC chip refers to a chip that operates using an NFC method using a band of 13.56 MHz among various RF-ID frequency bands such as 135 KHz, 13.56 MHz, 433 MHz, 860 to 960 MHz, and 2.45 GHz. When the WiFi chip or the Bluetooth chip is used, the chip may first transmit and receive various connection information such as SSID, a session key, and the like, perform communication using the various connection information, and then, transmit and receive various information. The wireless communication chip refers to a chip that performs communication according to various communication standards such as IEEE, ZigBee, 3rd generation (3G), 3rd generation partnership project (3GPP), long term evolution (LTE), and the like.

In particular, the communicator 140 may communicate with the external content server 200. In particular, the communicator 140 may transmit user private information and user state information to the content server 200 and receive education content generated based on the user private information and the user state information from the content server 200. In this case, the communicator 140 may receive the education content in a streaming form from the content server 200 in real time.

In addition, the communicator 140 may receive the user private information from the external user device 300.

The storage 150 stores various modules for driving the multimedia apparatus 100. For example, the storage 150 may store software including a base module, a sensing module, a communication module, a presentation module, a web browser module, and a service module. In this case, the base module is a basic module that processes a signal transmitted from hardware contained in the multimedia apparatus 100 and transmits the signal to a higher layer module. The sensing module may be a module that collects information from various sensors and analyzes and manages the collected information and may include a face recognition module, a voice recognition module, a motion recognition module, an NFC recognition module, and the like. The presentation module may be a module for configuring a display image and may include a multimedia module for reproducing and outputting multimedia content and a user interface (UI) rendering module for performing UI and graphic processing. The communication module is a module that communicates with an external device. The web browser module refers to a module that performs web browsing to access a web server. The service module is a module including various applications for providing various services.

In addition, the storage 150 stores user private information. In this case, the user private information may include at least one of user PIMS information, user preference information, and user schedule information. The user PIMS information may include user personal information, user academic information, and the like. The user preference information may be generated based on log information and search record of a multimedia device of the user. The user schedule information may be set by the user.

The aforementioned user private information may be stored in the multimedia apparatus 100. However, this is purely exemplary. That is, the user private information may be acquired from another user device 300.

The reproducer 120 reproduces education content according to control of the controller 130. In particular, the reproducer 120 may reproduce the education content generated based on the user private information and the user state information.

As illustrated in FIG. 3, the reproducer 120 may include a display 121 for displaying image data of the education content and an audio output unit 123 for outputting audio data of the education content.

The input unit 160 receives a user command for controlling the multimedia apparatus 100. In particular, the input unit 160 may receive a user command for setting various user private information.

The input unit 160 may be embodied as various input devices such as a touchscreen, a mouse, a keyboard, a voice recognition device, a motion recognition device, a pointing device, and the like.

The controller 130 controls an overall operation of the multimedia apparatus 100 using various programs stored in the storage 150.

As illustrated in FIG. 3, the controller 130 includes a random access memory (RAM) 131, a read only memory (ROM) 132, a graphic processor 133, a main central processing unit (CPU) 134, first to $n_{th}$ interfaces 135-1 to 135-$n$, and a bus 136. In this case, the RAM 131, the ROM 132, the graphic processor 133, the main CPU 134, the first to $n_{th}$ interfaces 135-1 to 135-$n$, etc. may be connected to each other through the bus 136.

The ROM 132 stores a command set for system booting. When a turn on command is input and power is supplied to the main CPU 134, the main CPU 134 copies an operating system (O/S) stored in the storage 150 and executes the O/S to boot a system according to a command stored in the ROM 132. When booting is completed, the main CPU 134 copies various application programs stored in the storage 150 in the RAM 131 and executes the application programs copied in the RAM 131 to perform various operations.

The graphic processor 133 generates an image containing various objects such as an icon, an image, a text, etc. using a calculator (not shown) and a renderer (not shown). The calculator calculates an attribute value such as a coordinate value, a shape, a size, color, etc. for displaying each object according to a layout of an image using a control command received from the input unit 160. The renderer generates an image having various layouts, containing an object, based on the attribute value calculated by the calculator. The image generated by the renderer is displayed in a display region of the display 121.

The main CPU 134 accesses the storage 150 to perform booting using the O/S stored in the storage 150. In addition, the main CPU 134 performs various operations using various programs, content, data, etc. stored in the storage 150.

The first to $n_{th}$ interfaces 135-1 to 135-$n$ are connected to the aforementioned various components. One of the first to $n_{th}$ interfaces 135-1 to 135-$n$ may be a network interface connected to an external device via a network.

As a non-limiting example, when a user logs in to access specific education content and user authentication information is received by the controller 130, the controller 130 acquires user private information corresponding to user authentication information and detects user sate using the detector 110 during reproduction of the executed education content. In addition, the controller 130 may control the reproducer 120 to change a parameter of education content to reproduce the education content according to the user private information and the user state.

In detail, the controller 130 performs a user login procedure for execution of the specific education content. As a non-limiting example, the controller 130 may perform the user login procedure using an ID/password method. When the user inputs a command for execution of the specific education content to the controller 130, the controller 130 may control the display 121 to display a UI for inputting an ID/password in order to perform the login procedure of the specific education content. In addition, when an ID/password is input to the UI through the input unit 160, the controller 130 may perform the user login procedure.

According to the aforementioned exemplary embodiments, the login procedure is performed using an ID/password method. However, this is purely exemplary. The user login procedure may be performed using various other authentication methods. For example, the controller 130 may perform the user login procedure using various authentication methods such as fingerprint recognition, face recognition, iris scan, voice recognition, and the like.

When the login procedure is performed, the controller 130 may acquire user private information from a device used by the user. In detail, the controller 130 may acquire the private information stored in the storage 150 included in the multimedia apparatus 100 or acquire private information stored in the user device 300 that communicates with the multimedia apparatus 100.

In this case, the private information may include PIMS information including personal information, academic information, and the like. In addition, the private information may include at least one of user preference information and user schedule information. As a non-limiting example, the user preference information may be generated based on a usage log or a search record of a device used by the user and may include information about a field and object preferred by the user. For example, when a number of times of a search record for a football using the multimedia apparatus 100 and a user device by the user is equal to or greater than a predetermined value, the controller 130 may acquire information about football as the user preference information. When a number of times of executing a song of a singer "PSY" by the user is equal to or greater than a predetermined value, the controller 130 may acquire information about "PSY" as the user preference information. In addition, the user schedule information may be received from the external user device 300. That is, when the user logs in, the controller 130 may synchronize with the user device 300 through the communicator 140 to automatically acquire the user schedule information.

The controller 130 may control the communicator 140 to transmit an education content request command to the content server 200. In this case, the controller 130 may control the communicator 140 to simultaneously transmit the acquired user private information to the content server 200.

Figure 4:
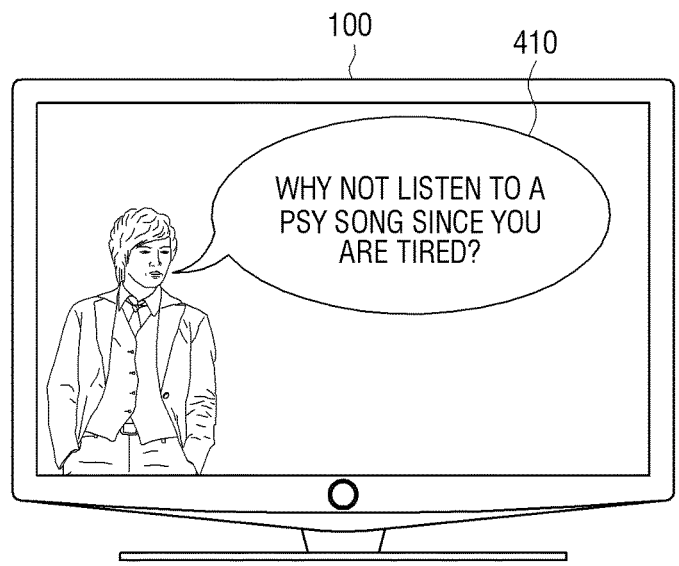
FIGS. 4 and 5 are diagrams illustrating questions and feedback according to user private information according to an exemplary embodiment.
Figure 5:
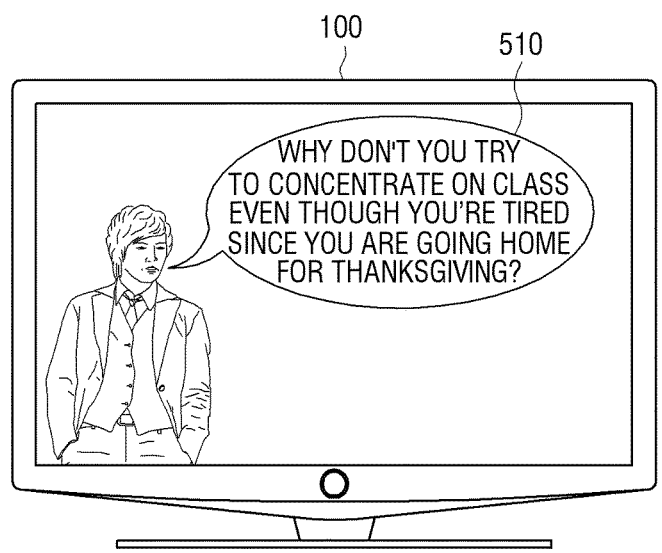

The content server 200 may generate education content based on the user private information and transmit the education content to the multimedia apparatus 100. As a non-limiting example, the content server 200 may generate feedback and questions using the user preference information and schedule information. For example, when the user preference information corresponds to "PSY", if it is determined that concentration of the user is degraded, the content server 200 may generate a feedback message 410 that is "Why not listen to a PSY song since you are tired?" and transmit the feedback message 410 to the multimedia apparatus 100, as illustrated in FIG. 4. According to another exemplary embodiment, when the user schedule information includes schedule information about visiting home on thanksgiving, the content server 200 may generate a feedback message 510 that is "Why don't you try to concentrate on class even though you're tired since you are going home for Thanksgiving?" and transmit the feedback message 510 to the multimedia apparatus 100, as illustrated in FIG. 5. According to another exemplary embodiment, when the user preference information corresponds to "PSY", the content server 200 may change a subject contained in the question to PSY, generate a question, and transmit the generated question to the multimedia apparatus 100.

As described above, education content may be generated using user private information such that a content provider more actively and effectively provides education content.

The controller 130 detects user state using the detector 110 during reproduction of the education content. In this case, the user state may be concentration and understanding of the user.

As a non-limiting example, the controller 130 may determine concentration of the user using a camera and motion sensor included in the detector 110 during reproduction of the education content. For example, when a number of times of user blink per second, which is photographed by the camera, is equal to or greater than a predetermined number of times or an eyesight direction of the user is deviated from the display 121 for a predetermined period of time or more, the controller 130 may detect that the concentration of the user is degraded. As another example, when a number of times of back and forth user face motion detected using the motion sensor is equal to or greater than a predetermined number of times, the controller 130 may detect that concentration of the user is degraded. According to the aforementioned exemplary embodiments, concentration of the user is detected using a camera and a motion sensor. As additional non-limiting examples, concentration of the user may be detected using other sensors (e.g., a brainwave recognition sensor, a pulsation recognition sensor, etc.).

During reproduction of education content, the controller 130 may determine understanding of the user, as a non-limiting example, by analyzing a user voice input through a microphone included in the detector 110. For example, when a question is output during reproduction of the education content, the controller 130 may analyze a user voice input to the microphone in response to the question. In addition, as the analysis result of the user voice, when the user voice input is an inappropriate response to the question, the controller 130 may detect that understanding of the user is degraded. As another non-limiting example, understanding of the user may be detected using a user response input through the input unit 160 (e.g., a mouse, a keyboard, a touchscreen, etc.).

When the user state is changed, the controller 130 may control the communicator 140 to transmit a signal including the changed user state to the content server 200. The content server 200 may change a parameter of the education content based on the signal including the changed user state. In this case, the parameter of the education content may include at least one of a teaching method, content type, learning difficulty, learning speed, learning feedback, learning time, learning language, intonation, and learning amount of the education content. The content server 200 may transmit the education content with the changed parameter to the multimedia apparatus 100.

The controller 130 may control the reproducer 120 to reproduce the education content with the changed parameter.

Figure 6:
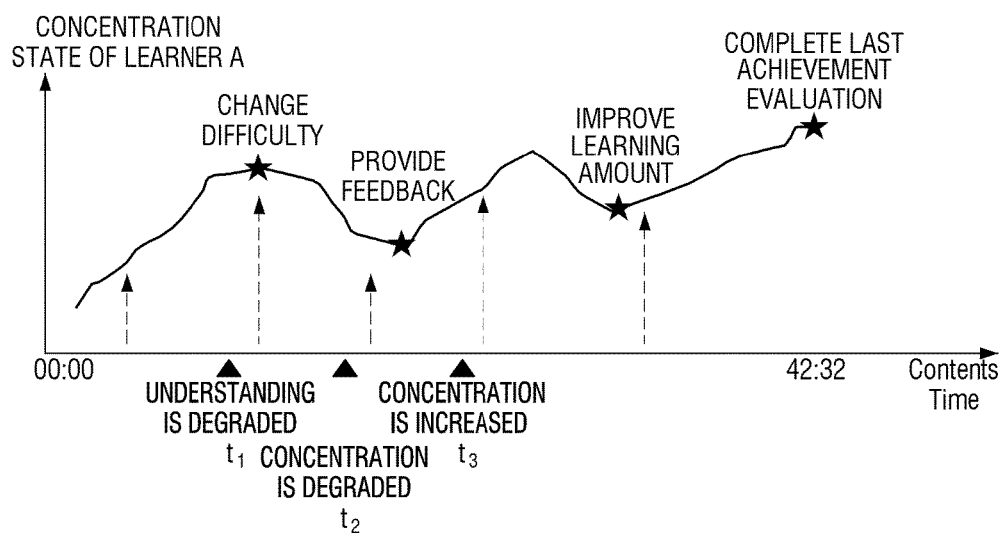
FIG. 6 is a diagram illustrating education content generated according to user state according to an exemplary embodiment.
Figure 7:
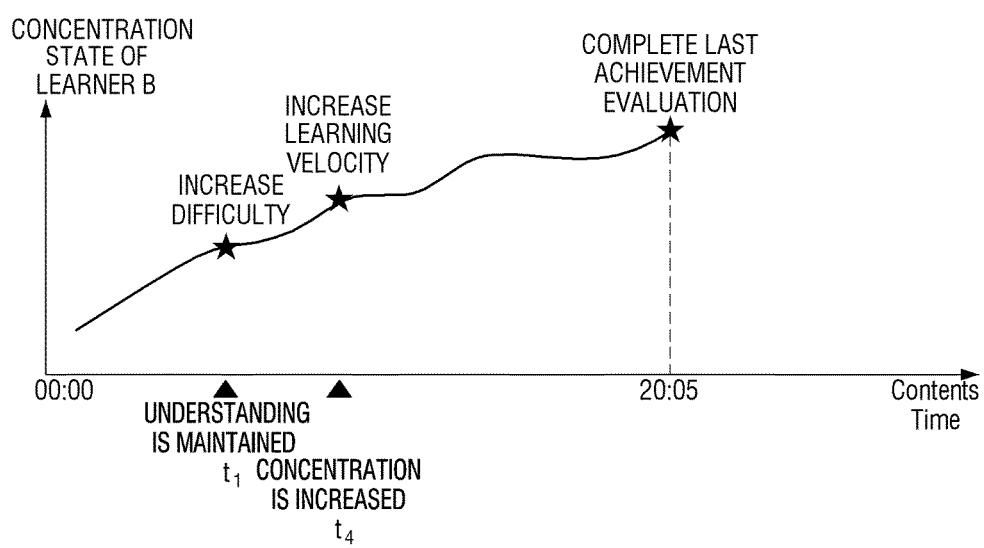
FIG. 7 is a diagram illustrating a case in which different education contents are generated according to user state according to an exemplary embodiment.

Change of a parameter according to user state will be described in more detail with regard to exemplary embodiments with reference to FIGS. 6 and 7. FIG. 6 illustrates an exemplary embodiment of reproduction of education content by a user A. FIG. 7 illustrates an exemplary embodiment of reproduction of education content by a user B.

Referring to FIG. 6, when the user A logs in, the controller 130 controls the reproducer 120 to reproduce education content received from the content server 200. In addition, the controller 130 controls the display 121 to generate and display a question for determining understanding of a user at a point of time t1. When a response of the user A to the question is not correct, the controller 130 may determine that understanding is degraded and control the communicator 140 to transmit the understanding of the user to the content server 200. The content server 200 may change a parameter of the education content to change learning difficulty as understanding of the user A is degraded. During reproduction of education content having low learning difficulty, the controller 130 may determine that concentration of the user A is degraded at a point of time t2. The controller 130 may control the communicator 140 to transmit concentration state of the user A to the content server 200 as concentration of the user A is degraded. The content server 200 may change a parameter of the education content to provide feedback such as reproduction of a moving picture as concentration of the user A is degraded. In this case, the feedback may be generated according to private information of the user A. After the feedback is provided to the controller 130, the controller 130 may determine that concentration of the user A is improved at a point of time t3. The controller 130 may control the communicator 140 to transmit the concentration state of the user A to the content server 200 as concentration of the user A is improved. The content server 200 may change a parameter of education content to increase learning amount. Using the aforementioned method, the user A may complete achievement evaluation for education content at a last point of time, i.e., 42 minute 32 second.

Referring to FIG. 7, when the user B logs in, the controller 130 controls the reproducer 120 to reproduce education content received from the content server 200. In addition, the controller 130 controls the display 121 to generate and display a question for determining understanding of a user at a point of time t1. When a response of the user B to the question is correct, the controller 130 may determine that understanding is maintained and control the communicator 140 to transmit understanding of the user B to the content server 200. The content server 200 may change a parameter of the education content to increase learning difficulty as understanding of the user B is maintained. During reproduction of education content having high learning difficulty, the controller 130 may determine that concentration of the user B is increased at a point of time t4. The controller 130 may control the communicator 140 to transmit concentration state of the user B to the content server 200 as concentration of the user B is increased. The content server 200 may change a parameter of the education content to increase learning speed as concentration of the user A is increased. Using the aforementioned method, the user B may complete achievement evaluation for education content at a last point of time, i.e., 20 minute 05 second.

That is, as described with reference to FIGS. 6 and 7, despite the same education content, the education content may be provided using different methods according to user state. Thus, effective education content may be provided according to the user state.

Figure 8:
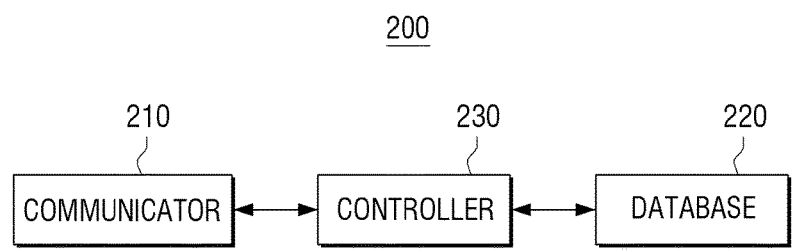
FIG. 8 is a schematic diagram illustrating a structure of a server according to an exemplary embodiment.

Hereinafter, the content server 200 will be described in more detail with reference to FIG. 8. As described above, the content server 200 includes a communicator 210, a database 220, and a controller 230.

The communicator 210 communicates with the multimedia apparatus 100. In particular, the communicator 210 may receive user private information and state information from the multimedia apparatus 100.

In addition, the communicator 210 may transmit the education content to the multimedia apparatus 100. In this case, the communicator 210 may transmit the education content in a streaming form to the multimedia apparatus 100 in real time.

The database 220 stores various modules and data for providing education content. In particular, the database 220 may store a parameter of the education content in the form of a learning object template. For example, the database 220 may store learning object template with "high" difficulty, learning object template with "medium" difficulty, and learning object template with "low" difficulty according to difficulty of the education content. As another example, the database 220 may store "discussion type" learning object template, "question and answer type" learning object template, and "lecture type" learning object template according to a teaching method of education content. The aforementioned learning object template is purely exemplary. Thus, a plurality of learning object templates may be stored according to parameters of other education contents. In addition, the database 220 may map the learning object template to user state and store the learning object template.

Thus, the database 220 may extract learning object template according to user private information and state information and combine the extracted learning object template to generate education content.

In addition, the database 220 may store various modules for providing an online education service, such as, as a non-limiting example, a user private information storage module, a user state information storage module, a parameter change module, an understanding measurement module, a concentration measurement module, a question generating module, a level test module, an education content manufacture module, etc.

The controller 230 controls an overall function of a server 200 using the various modules stored in the database 220. As a non-limiting example, the controller 230 may select a parameter of the education content based on the user private information and state information, which are received from the multimedia apparatus 100, to generate the education content.

In detail, upon receiving academic information of the user, the controller 230 may select the difficulty and learning method of the education content based on the academic information of the user to generate the education content.

Upon receiving the user preference information or schedule information, the controller 230 may generate feedback or a question according to the user preference information or schedule information. For example, the controller 230 may determine a name of a singer preferred by the user and generate the question based on the user preferred singer.

Upon receiving user concentration information or understanding information, the controller 230 may generate a parameter of the education content based on the user concentration information or understanding information and generate the education content. For example, upon determining that the user concentration information or understanding information is degraded, the controller 230 may change the parameter using various methods such as, as a non-limiting example, a method for changing a teaching method to a "question and answer type" teaching method, a method for changing a term to an easy term, a method for lowering difficulty, a method for lowering learning speed, a method for providing feedback, etc. in order to improve the user concentration or understanding. As another example, upon determining that the user concentration or understanding is improved, the controller 230 may change the parameter using various methods such as, as non-limiting examples, a method for changing a teaching method to a "lecture type" teaching method, a method for changing a term to a difficult term, a method for increasing difficulty, a method for increasing learning speed, a method for providing a difficult question, etc. in order to improve the user concentration or understanding.

As described above, the controller 230 may model the education content based on the user state information and private information and provide the education content to the multimedia apparatus 100.

Hereinafter, a method for providing content will be described with reference to FIGS. 9 and 10.

Figure 9:
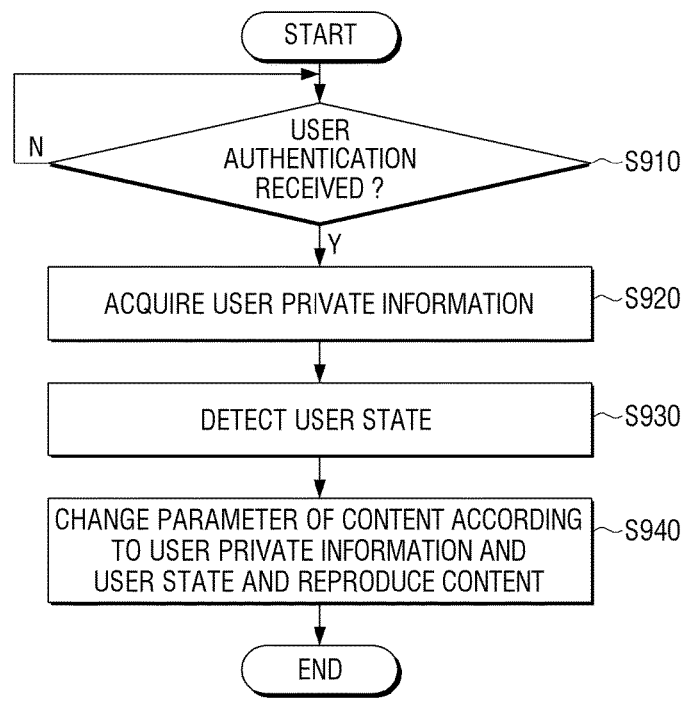
FIG. 9 is a flowchart of a method for providing content of a multimedia apparatus according to an exemplary embodiment.

FIG. 9 is a flowchart illustrating a method for providing content of the multimedia apparatus 100 according to an exemplary embodiment.

First, the multimedia apparatus 100 determines whether a user logs in and user authentication information is received (S910). The multimedia apparatus 100 may perform a login procedure using various methods such as, as non-limiting examples, ID/password, fingerprint recognition, face recognition, iris scan, voice recognition, and the like.

Upon receiving the user authentication information (S910-Y), the multimedia apparatus 100 acquires user private information (S920). As a non-limiting example, the multimedia apparatus 100 may acquire user preference information or schedule information using the device 100 or 300 used by the user.

The multimedia apparatus 100 detects user state (S930). As non-limiting examples, the multimedia apparatus 100 may detect user concentration using a camera, a motion sensor, and the like and detect user understanding through user voice input to a microphone.

In addition, the multimedia apparatus 100 changes a parameter of content based on the user private information and user state and reproduces the content (S940). As a non-limiting example, the multimedia apparatus 100 transmits the user private information and user state to the external content server 200. In addition, the media apparatus 100 receives content with a changed parameter according to the user private information and user state, from the content server 200, and may reproduce the content with the changed parameter.

FIG. 10 is a sequence diagram illustrating a method for providing education content of the online education system 10 according to an exemplary embodiment.

First, the multimedia apparatus 100 performs a login procedure of a learner (S1005).

The multimedia apparatus 100 requests the user device 300 for private information of the learner (S1010).

The user device 300 transmits the private information to the multimedia apparatus 100 in response to the request (S1015). In this case, the private information may include preference information and schedule information of the learner.

The multimedia apparatus 100 transmits an education content request command to the content server 200 (S1020). In this case, the education content request command may include the private information of the learner.

The content server 200 generates the education content based on the private information of the learner (S1025). The content server 200 generates the education content based on the private information of the learner (S1025) and transmits the generated education content to the multimedia apparatus 100 (S1030).

The multimedia apparatus 100 reproduces the education content received from the content server 200 (S1035).

During reproduction of the education content, the multimedia apparatus 100 detects a learner state (S1040). As a non-limiting example, the learner state may be concentration or understanding of the learner.

The multimedia apparatus 100 transmits the detected learner state information to the content server 200 (S1045).

The content server 200 changes a parameter of the education content based on the learner state and generates the education content with the changed parameter (S1050). The content server 200 transmits the education content with the changed parameter to the multimedia apparatus 100 (S1055).

The multimedia apparatus 100 reproduces the education content, the parameter of which is changed (S1060).

The aforementioned method for providing content of an online education system may provide the education content that is actively changed according to the private information and learning state of the learner such that the learner more effectively performs learning using the education content.

According to the aforementioned exemplary embodiments, the multimedia apparatus 100 transmits the user private information to the content server 200. However, this is purely exemplary. That is, the content server 200 may acquire user private information from a user device.

In addition, according to the aforementioned exemplary embodiments, the content server 200 provides the education content from outside. However, this is purely exemplary. That is, the multimedia apparatus 100 may provide the education content.

A program code for execution of a method for providing content of a multimedia apparatus according to the aforementioned various exemplary embodiments may be stored in various types of recording media. In detail, the program code may be stored in various types of recording media readable by user equipment, for example, a RAM, a flash memory, a ROM, an erasable programmable ROM (EPROM), an electronically erasable and programmable ROM (EEPROM), a register, a hard disk, a removable disk, a memory card, a universal serial bus (USB) memory, a CD-ROM, etc.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for providing content of a multimedia apparatus, the method comprising:
   receiving, by the multimedia apparatus, authentication information of a user for execution of content;
   acquiring, by the multimedia apparatus, user private information upon receiving the authentication information of the user for execution of the content, the user private information including user preference information and user schedule information;
   transmitting, by the multimedia apparatus, the acquired user private information including the user preference information and the user schedule information to an external content server;
   reproducing content by receiving the content from the external content server;
   detecting, by the multimedia apparatus, a state of the user viewing the content using at least a camera during reproduction of the content;
   transmitting, by the multimedia apparatus, information about the detected state of the user to the external content server;
   receiving, by the multimedia apparatus, content changed according to a parameter of content corresponding to the acquired user private information and the detected state of the user from the external content server; and
   reproducing the received content changed according to the parameter,
   wherein the acquiring the user private information comprises obtaining information on a number of times of executing a content or information on a number of times of a search record for a content from an external device used by the user and acquiring the user preference information based on comparison between the number of times of executing the content or the number of times of the search record and a predetermined value, and
   wherein the state of the user includes a concentration of the user, and the detecting the state of the user comprises detecting the concentration of the user viewing the content according to at least one of a blink rate of the user and an eyesight direction of the user photographed by the camera,
   wherein the method further comprises:
   in response to the concentration of the user being degraded, displaying, by the multimedia apparatus, a feedback message generated by the external content server based on the user schedule information in the user private information, and
   wherein the displayed feedback message includes information related to the user schedule information.

2. The method as claimed in claim 1, wherein the acquiring comprises acquiring the schedule information from the external device used by the user upon receiving the authentication information of the user.

3. The method as claimed in claim 1, wherein, in response to the content being education content, the reproducing comprises generating and reproducing a question or feedback using at least one of the user preference information and the schedule information of the user.

4. The method as claimed in claim 1, wherein the concentration of the user is detected according to the blink rate of the user and the eyesight direction of the user photographed by the camera, and motion of a user face detected by a motion sensor.

5. The method as claimed in claim 1, wherein the detecting comprises:
   outputting a question about content that is currently reproduced at a predetermined interval; and
   detecting an understanding of the user according to a user voice input in response to the question.

6. The method as claimed in claim 1, wherein:
   the external content server stores the parameter of the content in the form of an object template; and
   the object template is mapped to the state of the user.

7. The method as claimed in claim 1, wherein, in response to the content being education content, the parameter of the education content comprises at least one from a set of a teaching method, content type, learning difficulty, learning speed, learning feedback, learning time, learning language, intonation, and learning amount of the education content.

8. A multimedia apparatus comprising:
   a communicator configured to communicate with an external content server;
   a detector configured to detect a state of a user using at least a camera; and
   a controller configured to:
   receive authentication information of the user for execution of content,
   acquire user private information upon receiving the authentication information of the user for execution of content, the user private information including user preference information and user schedule information,
   control the communicator to transmit the acquired user private information including the user preference information and the user schedule information to the external content server,
   reproduce content by receiving the content from the external content server,
   control the detector to detect the state of the user viewing the content using the camera during reproduction of the content, and
   control the communicator to transmit information about the detected state of the user to the external content server and to receive content changed according to a parameter of content corresponding to the acquired user private information and the detected state of the user from the external content server, and reproduce the received content changed according to the parameter of content,
wherein the state of the user includes a concentration of the user,
wherein the controller is further configured to:
obtain information on a number of times of executing a content or information on a number of times of a search record for a content from an external device used by the user,
acquire the user preference information based on comparison between the number of times of executing the content or the number of times of the search record and a predetermined value,
control the detector to detect the concentration of the user viewing the content according to at least one of a blink rate of the user and an eyesight direction of the user photographed by the camera,
in response to the concentration of the user being degraded, display a feedback message generated by the external content server based on the user schedule information in the user private information,
wherein the displayed feedback message includes information related to the user schedule information.

9. The multimedia apparatus as claimed in claim 8, wherein the controller is configured to acquire the schedule information from the external device used by the user upon receiving the authentication information of the user.

10. The multimedia apparatus as claimed in of claim 8, wherein, in response to the content being education content, the controller is further configured to generate and reproduce a question or feedback using at least one of the user preference information and the user schedule information.

11. The multimedia apparatus as claimed in claim 8, wherein:
the detector further comprises a motion sensor; and
the controller is further configured to detect the concentration of the user according to the blink rate of the user and the eyesight direction of the user, photographed by the camera, and motion of a user face detected by the motion sensor.

12. The multimedia apparatus as claimed in claim 8, wherein the controller is further configured to output a question about the reproduced content at a predetermined interval, to detect an understanding of the user according to a user voice input in response to the question.

13. The multimedia apparatus as claimed in claim 8, wherein:

the external content server is configured to store the parameter of the content in the form of an object template; and
the object template is mapped to the state of the user.

14. An online education content server configured to provide education content comprising:
a communicator configured to communicate with a multimedia apparatus including a camera; and
a controller configured to control the communicator to receive private information of a user that logs into the multimedia apparatus, to control the communicator to transmit the education content to the multimedia apparatus based on the user private information, and to control the communicator to receive information about a state of the user viewing the education content detected by the camera of the multimedia apparatus, the state of the user including a concentration of the user, and the concentration of the user viewing the content being detected by the multimedia apparatus according to at least one of a blink rate of the user and an eyesight direction of the user photographed by the camera,
wherein the controller is further configured to change the education content according to a parameter corresponding to the state of the user,
wherein the controller is further configured to control the communicator to transmit the changed education content to the multimedia apparatus,
wherein the private information includes user preference information and user schedule information received from the multimedia apparatus, the user preference information being acquired by obtaining information on a number of times of executing a content or information on a number of times of a search record for a content from an external device used by the user and comparing between the number of times of executing the content or the number of times of the search record and a predetermined value,
wherein the controller is further configured to, in response to determination that the concentration of the user is degraded based on the received information about the state of the user, generate a feedback message generated based on the user schedule information in the user private information and control the communicator to transmit the generated feedback message to the multimedia apparatus,
wherein the transmitted feedback message includes information related to the user schedule information.

\* \* \* \* \*